(12) United States Patent  
Andrus et al.

(10) Patent No.: US 7,216,174 B2  
(45) Date of Patent: May 8, 2007

(54) IMPLEMENTING AND COORDINATING CONFIGURATION OF PROTOCOL PROCESSES

(75) Inventors: Don Andrus, Encinitas, CA (US); Nicholas Neft, Cardiff By The Sea, CA (US)

(73) Assignee: Qualcomm Incorporated, San Diego, CA (US)

( * ) Notice: Subject to any disclaimer, the term of this patent is extended or adjusted under 35 U.S.C. 154(b) by 72 days.

(21) Appl. No.: 11/244,671

(22) Filed: Oct. 5, 2005

(65) Prior Publication Data

US 2006/0036744 A1 Feb. 16, 2006

Related U.S. Application Data

(62) Division of application No. 09/895,424, filed on Jun. 29, 2001, now abandoned.

(51) Int. Cl.
| | |
|---|---|
| *G06F 15/16* | (2006.01) |
| *G06F 15/177* | (2006.01) |
| *G06F 9/00* | (2006.01) |
| *H04M 3/00* | (2006.01) |

(52) U.S. Cl. ............... 709/227; 709/220; 713/100; 455/420

(58) Field of Classification Search .............. None  
See application file for complete search history.

(56) References Cited

U.S. PATENT DOCUMENTS

| | | | | |
|---|---|---|---|---|
| 6,021,493 A | * | 2/2000 | Cromer et al. ............. | 726/35 |
| 6,412,025 B1 | * | 6/2002 | Cheston et al. ............ | 710/8 |
| 2002/0083156 A1 | * | 6/2002 | Wysoczynski .............. | 709/219 |
| 2002/0173315 A1 | * | 11/2002 | Chmaytelli et al. ........ | 455/453 |
| 2002/0193110 A1 | * | 12/2002 | Julka et al. ............... | 455/432 |
| 2002/0197985 A1 | * | 12/2002 | Tourrilhes et al. ......... | 455/420 |
| 2003/0118049 A1 | * | 6/2003 | Bender et al. ............. | 370/466 |
| 2004/0132473 A1 | * | 7/2004 | Mir et al. .................. | 455/517 |

* cited by examiner

*Primary Examiner*—Wen-Tai Lin  
(74) *Attorney, Agent, or Firm*—Thomas Rouse; Charles D. Brown; George C. Pappas

(57) ABSTRACT

The present invention employs a method for coordinating communication of protocol processes within Access Terminals in order for the Access Terminals to successfully and efficiently communicate with the protocol processes within an Access Network. The method of the present invention can be used in conjunction with the current IS-856 standard. After receiving an indication of required configuration from one or more of the answering protocol processes, the SCP issues a configuration command to all of the answering protocol processes in the AT. If the answering protocol process determines that it needs to reconfigure any of its parameters, it accepts the configuration command and notifies the SCP that it has accepted the configuration command. Alternatively, if the answering protocol process determines that it does not need to reconfigure any of its parameters, it rejects the configuration command and notifies the SCP that it has rejected its configuration command. Communication between the Access Terminal and the Access Network then resumes.

28 Claims, 8 Drawing Sheets

State diagram of communication sequence between
Access Terminal and Network

Three Protocols of Session Layer

IMPLEMENTING AND COORDINATING CONFIGURATION OF PROTOCOL PROCESSES

CROSS REFERENCE TO RELATED APPLICATIONS

This application is a divisional of U.S. patent application Ser. No. 09/895,424, filed Jun. 29, 2001 now abandoned, entitled "IMPLEMENTING AND COORDINATING CONFIGURATION OF PROTOCOL PROCESSES."

BACKGROUND OF THE INVENTION

The present invention relates generally to the communication of access terminals with an IS-856 network on which the terminals are located, and more specifically to the coordination of the communication of the IS-856 protocols within the access terminals.

RELATED ART

In a typical network utilizing the IS-856 protocol standard, a network access terminal (AT) connected to a network (AN) routinely requires a change to its existing state. For example, on a network utilizing the IS-856 standard, an access terminal such as a mobile telephone has a dynamic address, which serves as its unique identifier (that is, as the telephone moves around the country, its assigned address changes accordingly). For instance, a mobile telephone in New York could have the address HDA412. Upon being transferred by its user to California, however, the mobile telephone's address might change to CDB139, for example.

As a result of this change of address, the AT may have to change its existing control channel cycle. If the AT was previously on channel 5 but is now required to be on channel 7, then a particular IS-856 protocol requiring such a change (that is, an answering protocol in the AT) must detect that the change needs to occur.

To accomplish such a change in the AT, the AT and the AN must communicate with each other. In particular, a protocol process of the AT known as the Session Configuration Protocol (SCP) (defined in the IS-856 standard as a protocol process responsible for coordinating and managing the configuration of other protocol processes), must communicate with its corresponding peer on the AN. Likewise, other non-SCP protocol processes of the AT requiring change must communicate with their corresponding peer on the AN.

While the IS-856 standard defines a specific time at which the AT is allowed to "speak" and a specific time at which the AN is allowed to "speak", prior to the development of the present invention, there was no defined standard for how the AT requiring a protocol process change coordinated its protocol processes to relay its need to change the existing status of one or more of its protocol processes (for example, changing of a control channel) to the AN. Similarly, before the present invention, there was no defined standard for the SCP of the AT to inform the protocol process requiring change that it was allowed to execute the change. Also, before the present invention, there was no defined interface for SCP to tell the protocol process requiring change of the appropriate time for the change to take effect. Additionally, prior to the present invention, there was no specified method for maintaining a session when power is lost and then restored.

Therefore, what is needed is a method which defines a standard by which an AT requiring configuration change coordinates its protocol processes to relay its need to change the existing configuration status of one or more of its protocol processes to the AN. The method should also define a standard by which the SCP of the AT informs the protocol process requiring a change in its status that it is allowed to execute the change.

SUMMARY OF THE INVENTION

The present invention meets the above-referenced needs by providing a method which defines a standard by which the AT requiring a protocol change coordinates its protocol processes to relay its need to change the existing configuration status of one or more of its protocol processes (for example, changing of a control channel) to the AN.

Upon initialization, SCP reads its last known status from non-volatile memory to determine if the session related data is valid. If the data is valid, SCP reads its own session related information. Then, all answering protocol processes refer to SCP to determine whether they should get previously negotiated data from non-volatile memory.

The present invention employs the use of commands and indications to facilitate the coordination of communication between the protocol processes of the AT. The AT contains a group of protocol processes wherein each member of the group is responsible for performing some function of the AT. Each protocol process in this group is referred to as an "answering protocol process." The AT also contains a protocol process that is responsible for managing the other protocol processes, the SCP protocol. After detecting a need to configure, one or more answering protocol processes send an indication to the SCP, notifying the SCP that at least one of the answering protocol process's attributes requires reconfiguration. Upon receiving this indication from one of the answering protocol processes, the SCP issues a configuration command to all of the answering protocol processes in the AT.

The configuration command is transmitted to all of the answering protocol processes in the AT to poll them in an attempt to discover whether they have a need to alter their current configuration. After an answering protocol process receives the configuration command, it checks its current configuration status and determines whether it needs to alter it (that is, the answering protocol process determines whether it needs to perform reconfiguration). If the answering protocol process determines that it needs to reconfigure any parameters that can be changed by configuration, it accepts the configuration command and notifies the SCP that it has accepted the configuration command. Alternatively, if the answering protocol process determines that it does not need to reconfigure any of its parameters, it rejects the configuration command and notifies the SCP that it has rejected its configuration command.

If all answering protocol processes reject the configuration command, SCP proceeds as if all configuration complete indications have been received. If at least one answering protocol process accepts the configuration command, however, it eventually transmits an indication to the SCP that it has completed configuration (that is, a configuration complete indication) or an indication that the configuration attempt failed (that is, a failed protocol configuration indication).

If a Session Management Protocol (SMP) receives the failed protocol configuration indication, the session is closed. If the SCP receives the configuration complete indication from all protocol processes that accepted the configuration command, the SCP transmits a configuration complete message to its corresponding peer in the network, notifying its peer that configuration on the part of the AT has been completed.

When SCP receives the configuration complete message, it returns the reconfigured indication. All answering protocol processes use this indication to begin the data agreed upon in the most recent round of negotiation.

The present invention also provides a method by which entrapment within an AT initiated state is prevented. The concern is that a traffic channel loss or network acquisition loss will occur during the AT initiated state and communication will be trapped in the AT initiated state. The present invention addresses this concern and prevents entrapment in the AT initiated state via the maintenance of timers designed to expire in a specified amount of time if the network does not respond with a response message. In addition, SCP will determine if configuration messages can be resent. If so, the answering protocol configuration commands will be recalled. The answering protocol process will stop a running timer if it is called.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIG. 3 is a flowchart representing the general operational flow for a method for initializing an AT.

FIG. 4A is a flowchart representing the general operational flow for a method for changing an existing condition in an AT from the perspective of the SCP in the AT.

FIG. 5A is a flowchart representing the general operational flow for a method for changing an existing condition in an AT from the perspective of an answering protocol process in the AT.

DETAILED DESCRIPTION OF THE PREFERRED EMBODIMENTS

Figure 1:
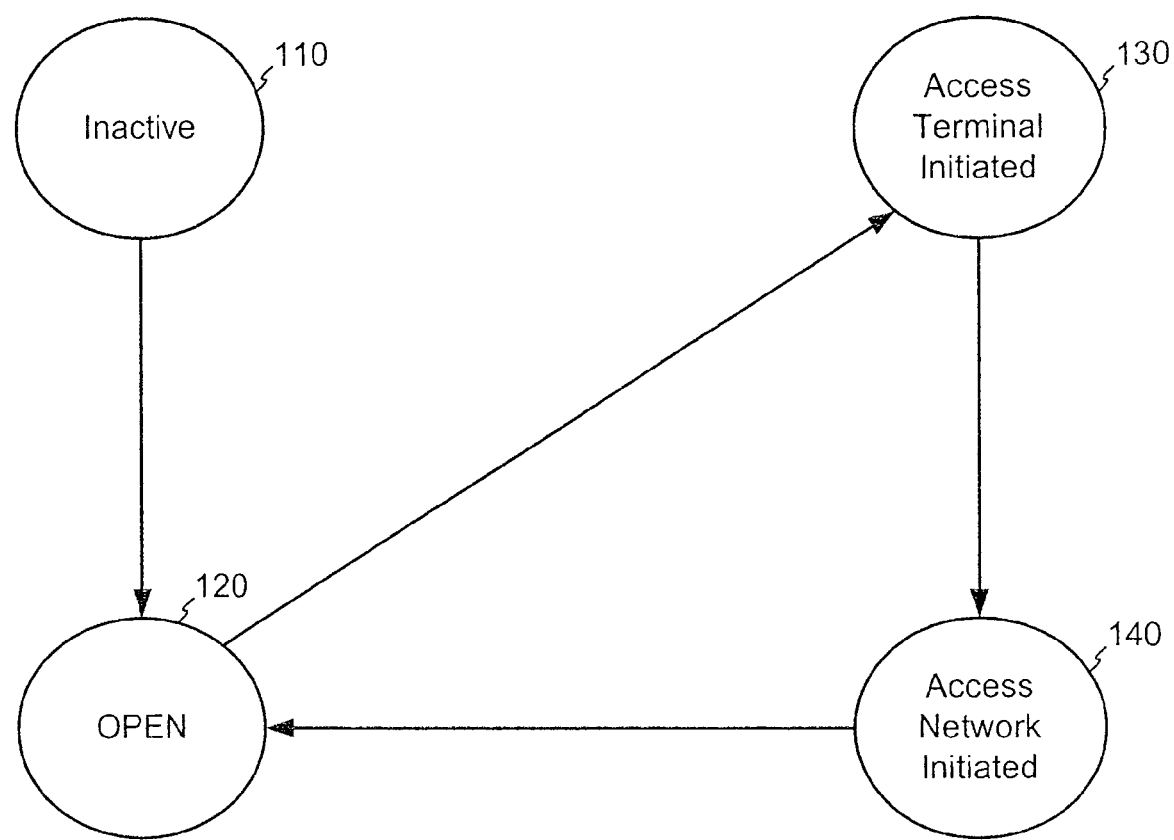
FIG. 1 is a state diagram depicting the relevant state transitions between an AT and an AN on which the AT is located.

FIG. 1 shows the relevant state transitions involved in the communication sequence between the AT and the AN. The figure illustrates the coordination of times at which protocols in the AT are allowed to speak, and the times at which protocol processes in the AN are allowed to speak. It should be noted that the communication between the AN and an AT is currently part of the IS-856 standard. However, the relevant state transitions depicted in FIG. 1 are shown to facilitate the understanding of the practical utility of the present invention (that is, to show how the present invention can be used in conjunction with the current IS-856 standard).

Communication is inactive, represented by inactive state 110, when there is not a current session and no configuration. A session is a shared state between the AT and the AN. It stores the protocols and configurations that were negotiated and used for communication between the AT and the AN. A session must be opened for communication to occur between the AT and the AN. Communication changes from inactive state 110 to open state 120 upon obtaining a session. No configuration is occurring, however, in open state 120. Thus, no protocol process in the AT is transmitting a request message to its corresponding peer on the AN to request configuration. (That is, no protocol process in the AT is transmitting a request message to an answering protocol process in the AN).

When at least one protocol process in the AT transmits a request message, communication changes to access terminal (AT) initiated state 130. For instance, referring to the above-referenced example of an AT protocol requiring a change of its control channel, the SCP of the AT must first receive notification from the answering protocol of the AT responsible for the required configuration change. Such notification informs the SCP of the AT that the control channel of the AT requires change. Upon receipt of the notification from the answering protocol, the SCP of the AT may transmit a configuration request message to the SCP in the network, configuring its own parameters. If this is necessary, SCP sends the configure command to all answering protocols. Upon transmission of the configuration request message from any protocol in the AT to its peer in the AN, communication changes from open state 120 to access terminal initiated state 130.

The AT speaks in the Access Terminal Initiated state 130. For instance, referring again to the above-referenced example, in the present invention, the SCP in the AT transmits a command to the protocol process responsible for changing the control channel (that is, one of the answering protocol processes). Upon completion of its configuration, the answering protocol process transmits an indication to the SCP in the AT indicating that it has completed configuration. Likewise, all answering protocol processes (that is, other protocol processes in the AT responsible for a particular change in the status of the AT) transmit a completed configuration indication to the SCP in the AT. Communication changes from Access Terminal Initiated state 130 to Access Network Initiated state 140 after SCP in the AT receives all indications of completed configuration from the answering protocol processes of the AT and sends the configuration complete message. The SCP in the AT then transmits notification to the SCP on the AN indicating that all protocol processes in the AT have completed their configuration (that is, the SCP on the AN transmits a configuration complete message to the SCP in the AT).

In the AN initiated state, any protocol process in the AN is allowed to send Configuration Request Messages to its peer in the AT. When the AN determines that it has finished configuration, the SCP on the AN transmits a configuration complete message back to the SCP in the AT. The configuration complete message transmitted from the SCP on the AN serves as notification to the SCP in the AT that the AN has completed its part of the configuration. The configuration complete message indicates the transition to the AT initiated state.

For instance, continuing with the above-referenced example of the change of an AT's control channel, transmission of the configuration complete message from the SCP on the AN to the SCP in the AT indicates that all of the necessary configuration required for changing the control channel of the AT has been completed on the AN side, and the control channel of the AT can now be changed and take effect upon return to the inactive state.

Figure 2:
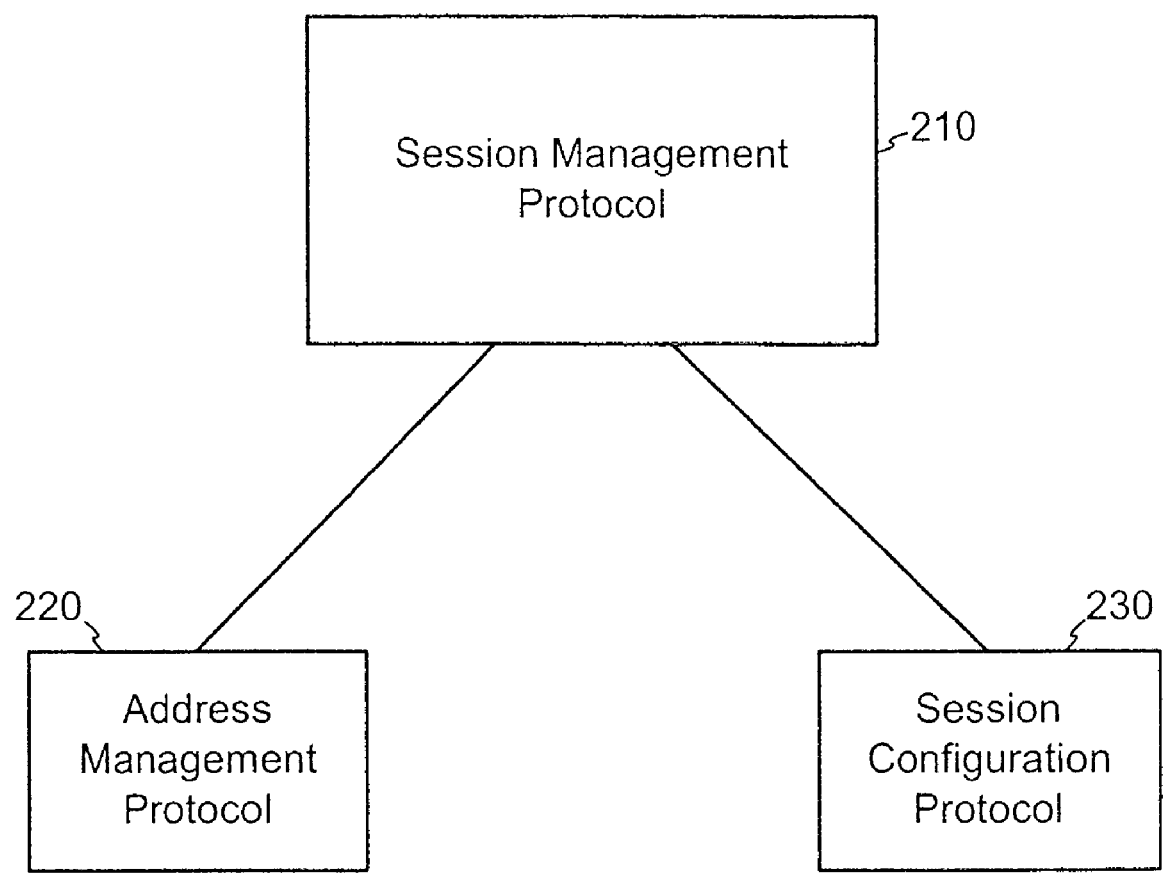
FIG. 2 is a block diagram representing the two protocol processes controlled by the Session Management Protocol.

Referring now to FIG. 2, the Session Layer of the protocol stack for the IS-856 standard comprises the Session Management Protocol (SMP) 210, the Address Management Protocol (AMP) 220, and the Session Configuration Protocol (SCP) 230.

The Session Layer of the stack is responsible for managing the sessions between cooperating applications that are transferring data to each other. SMP 210 is responsible for managing the activation of the other Session Layer protocol processes (that is, the SCP and the AMP) and the closure of the session. AMP 220 is responsible for maintaining address information. SCP 230 is responsible for handling protocol subtypes and maintaining the status of the current session, status during initiation, and coordination of answering protocol processes during configuration.

It should be noted that FIG. 2 is only presented for the purpose of providing the reader with insight as to where the focus lies in the present invention. Such insight is necessary in understanding how the present invention can be used in conjunction with the current IS-856 standard. All protocols depicted in FIG. 2 are currently part of the IS-856 standard.

Figure 3:
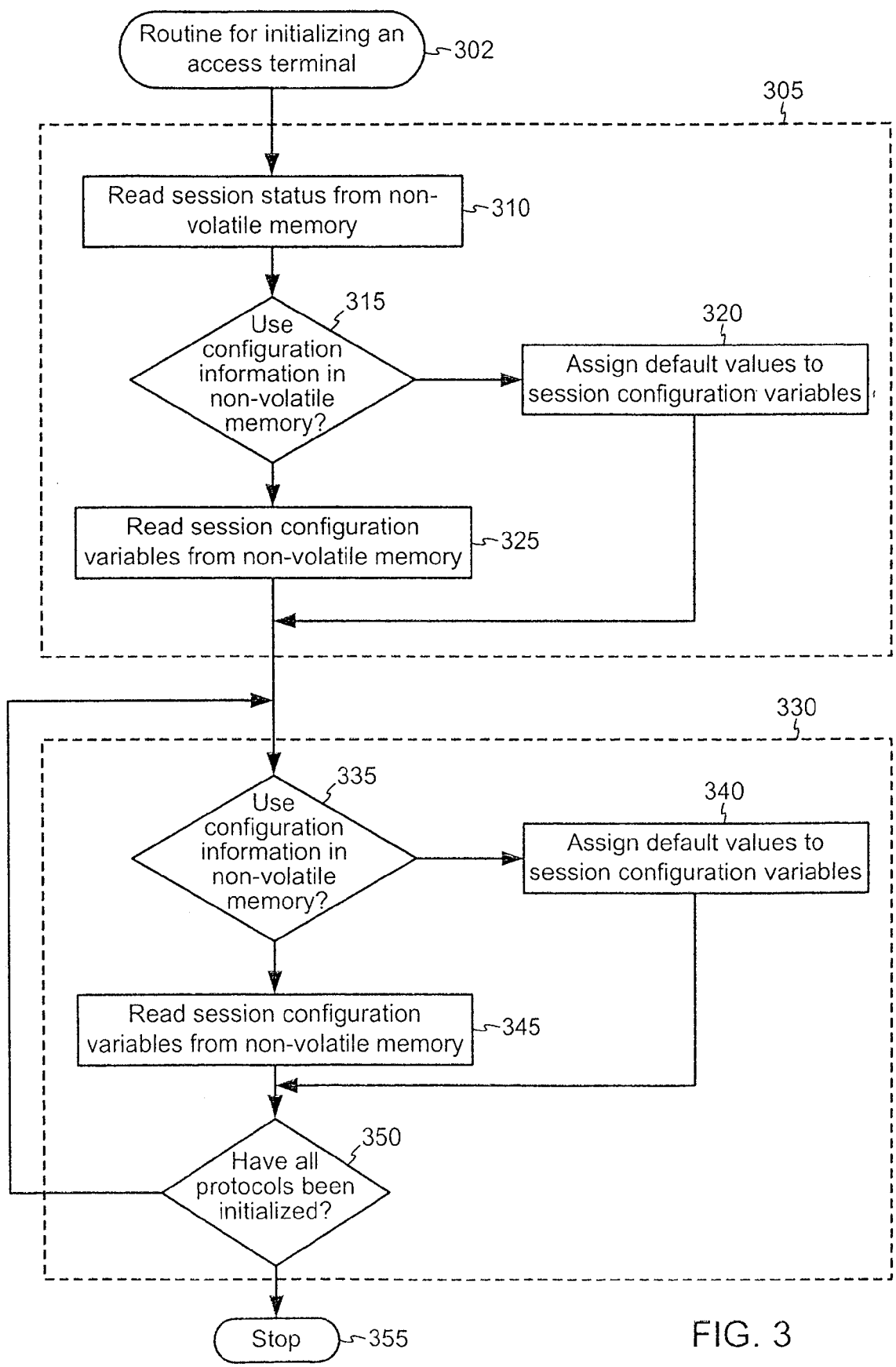

Referring to FIG. 3, a flowchart depicting a routine for initializing an access terminal 302 is shown. Control begins at step 305. In step 305, the SCP of the AT is initialized. Step 305 comprises four steps: step 310, step 315, step 320, and step 325.

For each session, all protocol processes maintain a group of variables for all session-related parameters. For instance, the SCP maintains a "current" variable indicating the current used subtypes for the session, and a "negotiated" variable indicating the values that were most recently negotiated but not yet used during the particular session. Similarly, the SCP maintains a "previous" variable indicating the values used in the previous session. A "default" variable is maintained and used when a value for a configurable attribute is requested from the AN and rejected. For the answering protocol processes that will send a configuration request message, a "desired" variable may be maintained. It includes the optimal values for all parameters and is set upon initialization and changed whenever related system attributes change.

Finally, the protocol processes contain a regional structure containing data regarding a currently negotiated configuration parameter. For instance, the structure could contain a transaction ID, sent attribute IDs, and a boolean flag to indicate whether the Signaling Link Protocol has received the acknowledgment for the transmitted configuration request message transmitted by a protocol in the AT. In one embodiment, this variable can also contain a list of data that has been sent. After a transmitting protocol process of the AT obtains a configuration response message from the AN, it can use the data stored in this structure to compare with the data received in the configuration response message from the AN. Thus, only protocol processes which are capable of sending a configuration request message would have this structure.

When the AT is initially powered, the negotiated, current, and previous values for the variables of the session-related parameters must somehow be determined.

Referring back to FIG. 3, in step 310, the first step of the initialization of the SCP of the AT, the session status is read from non-volatile memory. To accomplish this, a function is called to determine how the values for the variables of the various session-related parameters are to be determined.

In step 315, a determination is made as to whether session configuration data will be read from non-volatile memory.

The above-referenced function can return a value of true or false. A returned value of false indicates that the values for the variables are not to be read from non-volatile memory. In this case, in step 320, default values are assigned to the above-referenced current, negotiated, and default variables.

If the above-referenced function returns a value of true, in step 325, the values for the variables are read from a non-volatile memory and are systematically assigned to the appropriate variables. For instance, the current, negotiated, and default variables are all provided with values read from the non-volatile memory.

Step 325 marks the end of the initialization process of the SCP of the AT.

In step 330, the non-SCP protocols of the AT are initialized. Step 330 is comprised of steps 335, 340, 345, and 350. For each session, each answering protocol process maintains the above-referenced group of variables.

When the AT is initially powered, the negotiated, current, and previous values for the variables of all of the non-SCP protocols (that is, the answering protocols) must somehow be determined, just as they were for the SCP in the AT. In step 335, the first step of the initialization process of the answering protocol processes, a determination is made as to whether session configuration data will be read from non-volatile memory. In step 335, the session status need not be read again from non-volatile memory. Rather, the answering protocol process queries the SCP of the AT to determine whether it is to use the configuration data in non-volatile memory.

If the above-referenced function returned a value of false, in step 340, the values for the variables are assigned default values.

Alternatively, the function may return a value of false, indicating that the values for the variables are not to be read from non-volatile memory. In this situation, in step 345, the values for the variables are read from the non-volatile memory and are systematically assigned to the appropriate variables. In other words, the current, negotiated, and default variables are all provided with values read from the non-volatile memory.

In step 350, a determination is made as to whether all answering protocol processes have been initialized. If not, the next protocol process is initialized, which means steps 335–345 are repeated for that particular protocol process. These steps are repeated for every protocol process which needs to be initialized.

When all protocol processes have been initialized, control ends at step 355. At this point, the SCP of the AT and all answering protocol processes have been initialized.

Figure 4A:
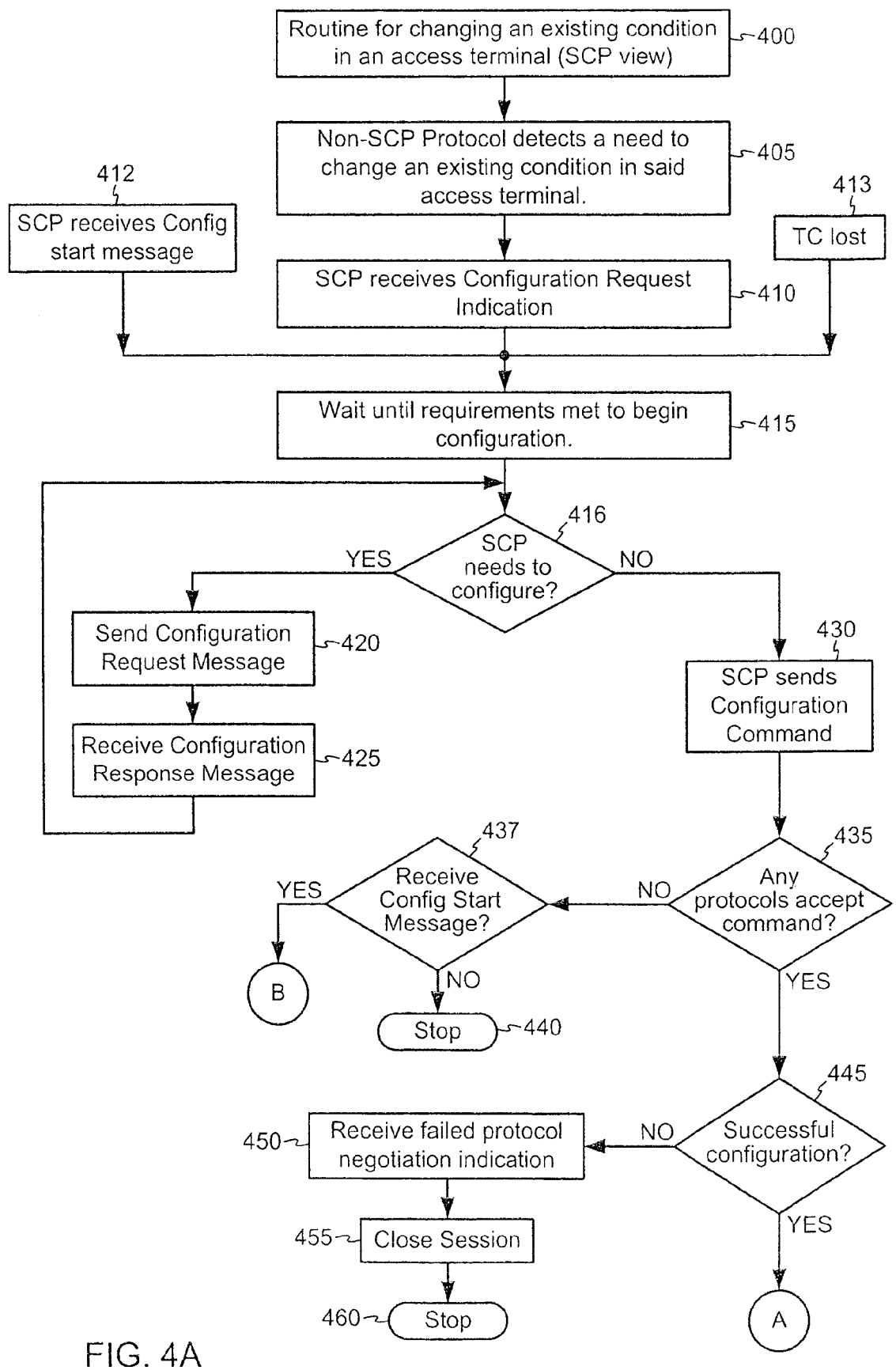

Referring now to FIG. 4A, a routine for changing an existing condition (that is, changing an existing configuration status) in an access terminal is shown from the perspective of the SCP in the AT.

Control begins with step 405. In step 405, an answering protocol process detects a need to change an existing condition in the AT. For instance, the protocol process responsible for changing the control channel of the AT detects that it needs to change the AT's control channel.

After the protocol process detects its need to change, in step 410, the SCP of the AT receives a configuration request indication from the answering protocol.

Alternatively, the need to change an existing condition in the AT may be triggered, in step 412, when SCP receives a configuration start message or, in step 413, when a traffic channel is lost. These two steps provide alternative paths to step 415.

In step 415, the SCP waits until requirements are met before beginning configuration. A requirement for beginning configuration may include acquisition of a network. When this condition is met, the SCP of the AT begins configuration. In step 416, a check is performed to see if SCP needs to reconfigure.

After the SCP of the AT receives notice that reconfiguration has been requested, in step 420, the protocol process sends a configuration request message to its corresponding peer in the network. The SCP contains a response timer which expires if its corresponding peer in the network does not transmit a configuration response message within a specified amount of time. Further, the SCP contains an awaiting acknowledgment flag which is used to notify it of successful delivery of its configuration request message to its corresponding peer in the network. The flag is initially set to true, indicating that it is currently awaiting acknowledgment of successful delivery of its configuration request message.

If the timer expires, the Session Management Protocol (SMP) of the AT transmits a session closed message to its corresponding peer on the AN. SCP stops the configuration response timer, and indicates that it is no longer awaiting notification of the successful delivery of its configuration request message by setting its awaiting acknowledgment flag to false. All protocol data from the "current" variable is then placed into the "previous" variable.

In step 425, the SCP of the AT receives a configuration response message from its corresponding peer in the AN. SCP can then go back to step 420 if it determines that another configuration request message is needed or it can proceed to step 430 if it is done.

In step 430, when it is determined that SCP does not need to reconfigure, the SCP of the AT sends a configuration command to all of the answering protocol processes in the AT, instructing them to begin the necessary configuration to carry out the required changes in their statuses. In certain situations, an answering protocol process in the AT will not accept the SCP's configure command. For instance, if the answering protocol process determines that it does not have a need to change its existing configuration, it rejects the SCP's configuration command.

In step 435, the SCP of the AT determines whether any of the answering protocol processes to which it transmitted the configuration command actually accepted the command. If the SCP received a boolean value of false, or 'No', from all of the answering protocol processes, it thereby determines that none of the answering protocol processes accepted the command (that is, all answering protocol processes rejected the configuration command). The SCP next checks to see if a configuration start message was received, step 437. If not, the SCP of the AT transmits a configuration complete message to its corresponding peer on the AN and no configuration occurs. Flow then stops at step 440. If a configuration start message is received, control continues in FIG. 4B with the letter B.

Alternatively, if the SCP of the AT receives a boolean value of true from the answering protocol, it thereby determines that the answering protocol process accepted the command. Control then resumes with step 445.

Next, in step 445, the answering protocol process determines whether its communication with its peer on the network was successful.

If communication was unsuccessful, then in step 450, the SCP of the AT receives a failed protocol negotiation indication from the answering protocol process.

In step 455, the SMP of the AT closes the session, and control then ends at step 460.

Figure 4B:
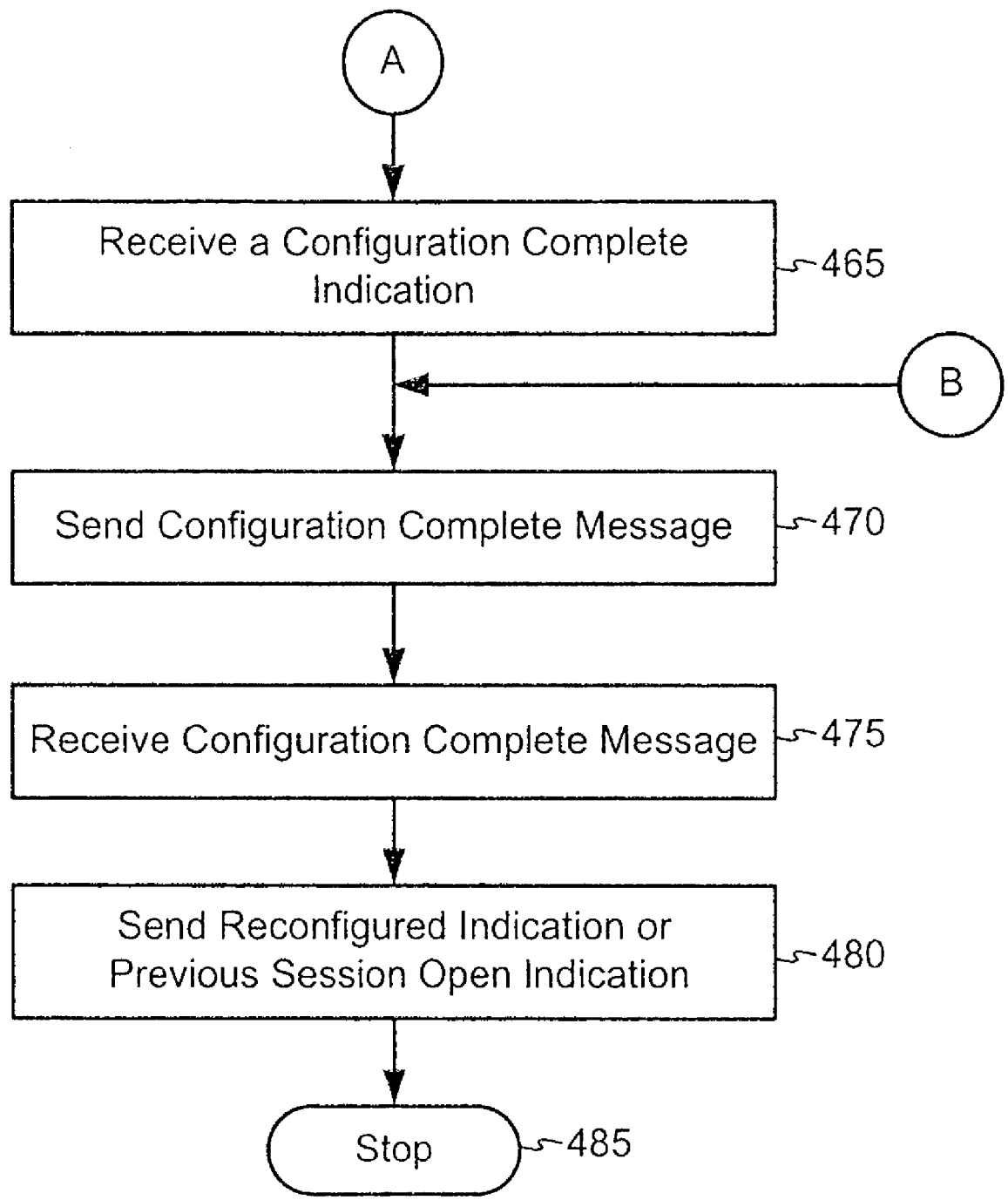
FIG. 4B is a flowchart depicting continuing flow of FIG. 4A.

Alternatively, if communication was successful, then control resumes in FIG. 4B with letter A. In step 465, the SCP of the AT receives a configuration complete indication from the answering protocol process.

Upon completion of the configuration and relay of this event back to the SCP of the AT (that is, upon receiving from the answering protocol process the configuration complete indication), in step 470, the SCP of the AT transmits a configuration complete message to its corresponding peer on the network (that is, the SCP on the network), thereby informing its peer that configuration has been completed on the AT side. This corresponds with the state transition from 120 to 130.

In step 475, the SCP of the AT receives a response from the SCP on the AN indicating that it has completed its part of the required configuration.

In step 480, the SCP of the AT transmits an indication to the answering protocol process informing the answering protocol that all necessary configuration has been completed (for example, the necessary configuration for the change in the AT's control channel has been completed). Alternatively, a previous session opened indication may be sent. Thus, the value of the negotiated or previous variables are copied to the current variable accordingly to reflect the new configuration.

Finally, control ends with step 485.

Figure 5A:
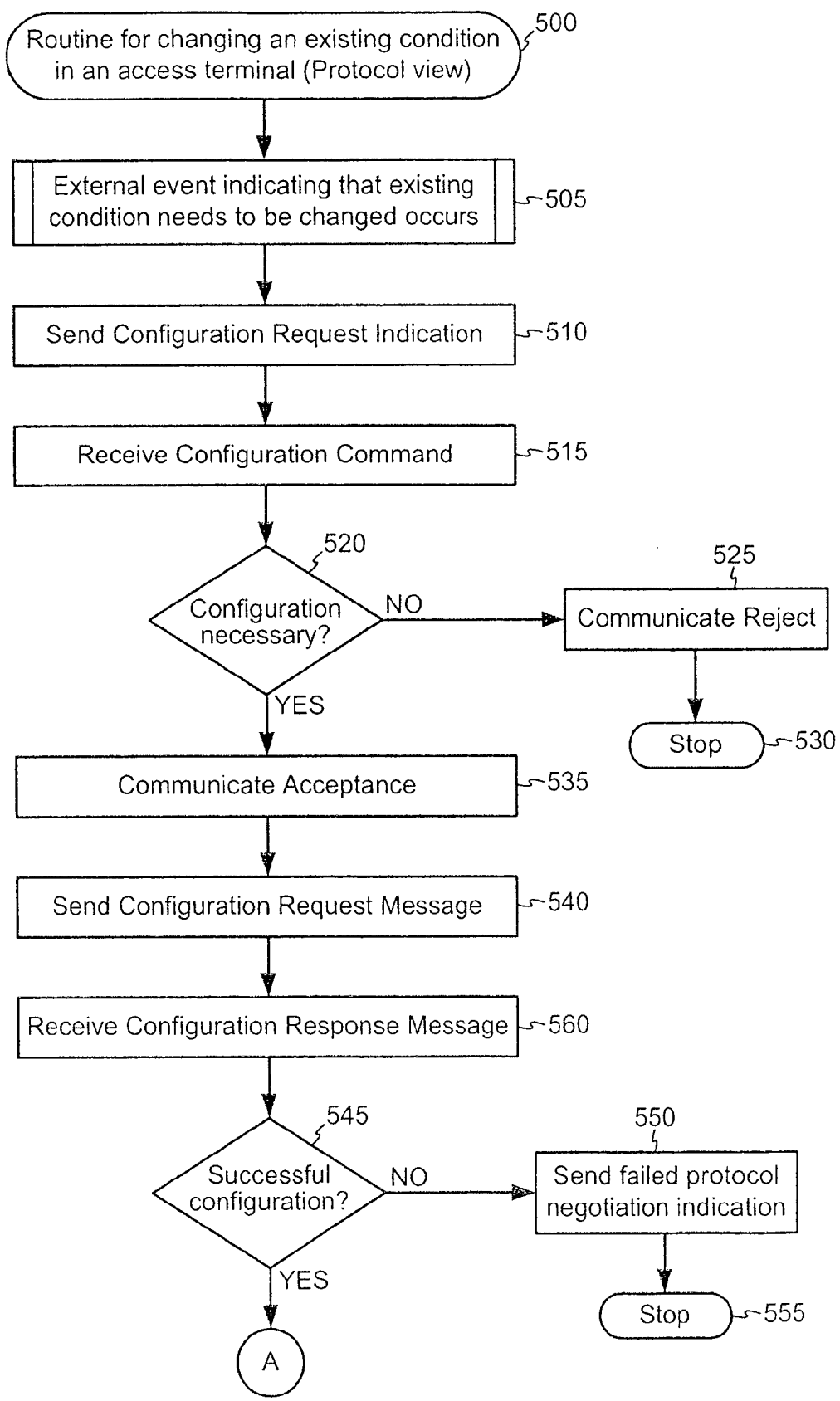

FIG. 5 shows a routine for changing an existing condition (that is, changing an existing status) in an AT from the perspective of the answering protocol process_500.

Control begins with step 505. In step 505, an external event indicates that an existing condition needs to be altered (for example, the control channel of the AT needs to be changed).

In step 510, the answering protocol process transmits a configuration request indication to the SCP of the AT, informing the AT of the external event triggering a need to reconfigure the session.

In step 515, the answering protocol process receives the configuration command from the SCP of the AT, instructing it to begin configuration. The routine can also be started here, for instance if a different answering protocol process sent the indication.

In step 520, the answering protocol process determines if the instructed configuration is necessary. It is possible that system configuration changed since the configuration request indication was sent so configuration is no longer needed.

In step 525, if the answering protocol process determines that the configuration is not necessary, it returns the boolean value of false to the SCP of the AT, thereby communicating its rejection of the SCP's configuration command. For instance, if the answering protocol process determines that it is satisfied with its session configuration variables and no configuration need occur, it can issue the rejection indication to the SCP of the AT. No configuration occurs and control then ends with step 530.

Alternatively, in step 535, if the answering protocol process determines that configuration is necessary, the answering protocol returns the boolean value of true to the SCP of the AT, thereby communicating its acceptance of the SCP's configuration command. The answering protocol process now prepares to communicate with its corresponding peer on the network.

The answering protocol process maintains a timer which expires in a specified amount of time if its corresponding peer in the network does not transmit a configuration response message within the specified amount of time. In one embodiment, this timer can be set to 2 seconds. One skilled in the art would recognize that this timer could be set for any amount of time useful for the present invention. The answering protocol process also maintains a timer signal that indicates whether the configuration response timer is currently running. After the answering protocol process accepts the configuration command transmitted to it from the SCP of the AT, it stops its timer and clears the timer signal.

After resetting the timer and clearing the signal, the answering protocol process determines the desired value of the attribute that requires configuration and stores this value into the "desired" variable (that is, the variable containing the value that represents the change in reconfiguration of the current session).

In step 540, the answering protocol process transmits a configuration request message to its corresponding peer on the network to instruct the network to begin its part of the required configuration. In the meantime, the answering protocol process records information about the attribute being configured in the above-referenced regional structure (for example, the attribute ID, transaction ID fields, and other flags are set). The answering protocol process also maintains an awaiting acknowledgment flag in the regional structure to determine if its request message was successfully delivered to its corresponding peer in the network. This flag is initially set to true, indicating that the answering protocol process is now awaiting indication from it corresponding peer on the AN that its configuration request message was successfully transmitted. In one embodiment, a different regional structure would be created for each configuration message to handle an answering protocol process having multiple different configuration messages outstanding at one time. If delivery of the configuration request message from the answering protocol process to its corresponding peer in the network was unsuccessful, the configuration request message will be sent a specified number of times. The awaiting acknowledgment flag will continue to maintain its value of true, indicating that the answering protocol process is still awaiting successful delivery of its configuration request message.

However, if the specified maximum number of times of retransmission of the configuration request message is exceeded, the answering protocol process immediately returns a failed protocol negotiation indication. Included amongst this data is the attribute ID of the offending attribute (that is, the attribute resulting in the failure). In another embodiment, the data would further include the transaction ID and any other data that would be useful for the SCP of the AT.

The answering protocol process of the AT transmits the failed protocol negotiation indication to the Session Management Protocol (SMP) of the AT. The current session is then closed. Finally, the SMP relays the failed protocol negotiation data to the AN, thereby informing the AN that the session was closed. This indication can contain the above-referenced data received from the answering protocol process.

If delivery of the configuration request message from the answering protocol process to its corresponding peer in the network was successful, the above-referenced acknowledgment flag is set to false because the answering protocol is no longer awaiting confirmation of successful delivery of its configuration request message. The configuration response timer and signal are then set.

If the configuration response timer expires, the answering protocol process transmits a failed protocol negotiation indication to the Session Management Protocol. The indication can include data associated with the failure (for example, the offending attribute ID). The current session is then closed. Finally, the SMP relays the failed protocol negotiation indication to the AN, thereby informing the AN that the session was closed. This indication can contain the above-referenced data received from the answering protocol process.

Thus, exceeding the maximum number of retransmission attempts from the answering protocol process to its peer and expiration of the timer are both events that can cause unsuccessful configuration of the session.

In step 560, the answering protocol process of the AT receives a configuration response message from its corresponding peer on the network within the specified maximum amount of time (that is, before the above-referenced timer expires). The waiting acknowledgment flag is now set to false because the configuration request message had to have been successfully delivered to the answering protocol process's corresponding peer on the network. Otherwise, the configuration response message would not have been received by the answering protocol process of the AT. Further, the configuration response timer is stopped because the answering protocol process is no longer awaiting the configuration response message from its corresponding peer on the AN. Similarly, the timer signal should be cleared because the timer is no longer running.

The answering protocol process then compares the ID of the configured attribute (for example, the identification tag of the control channel attribute of the AT) in the configuration response message it received from its peer on the AN with the ID of the configured attribute that it maintained in its regional structure before sending its configuration request message to its corresponding peer. This comparison is done to ensure that the answering protocol process's corresponding peer on the network actually configured the attributes the answering protocol process asked it to configure. In another embodiment, the returned ID contained in the response message is also compared to the value in the "desired" variable to ensure that the desired result was obtained. In yet another embodiment, other comparisons may also be made. The usefulness of such comparisons would be recognized by one skilled in the relevant art.

If the ID comparison results in a positive match, the answering protocol process then stores the agreed-upon value of the configured attribute into its negotiated variable and default variable.

In step 545, the answering protocol process determines whether either of these events have occurred as described above.

If the answering protocol process determines that configuration of the session was unsuccessful, then in step 550, the answering protocol transmits a failed protocol negotiation indication to the SMP of the AT. Control then ends with step 555.

Figure 5B:
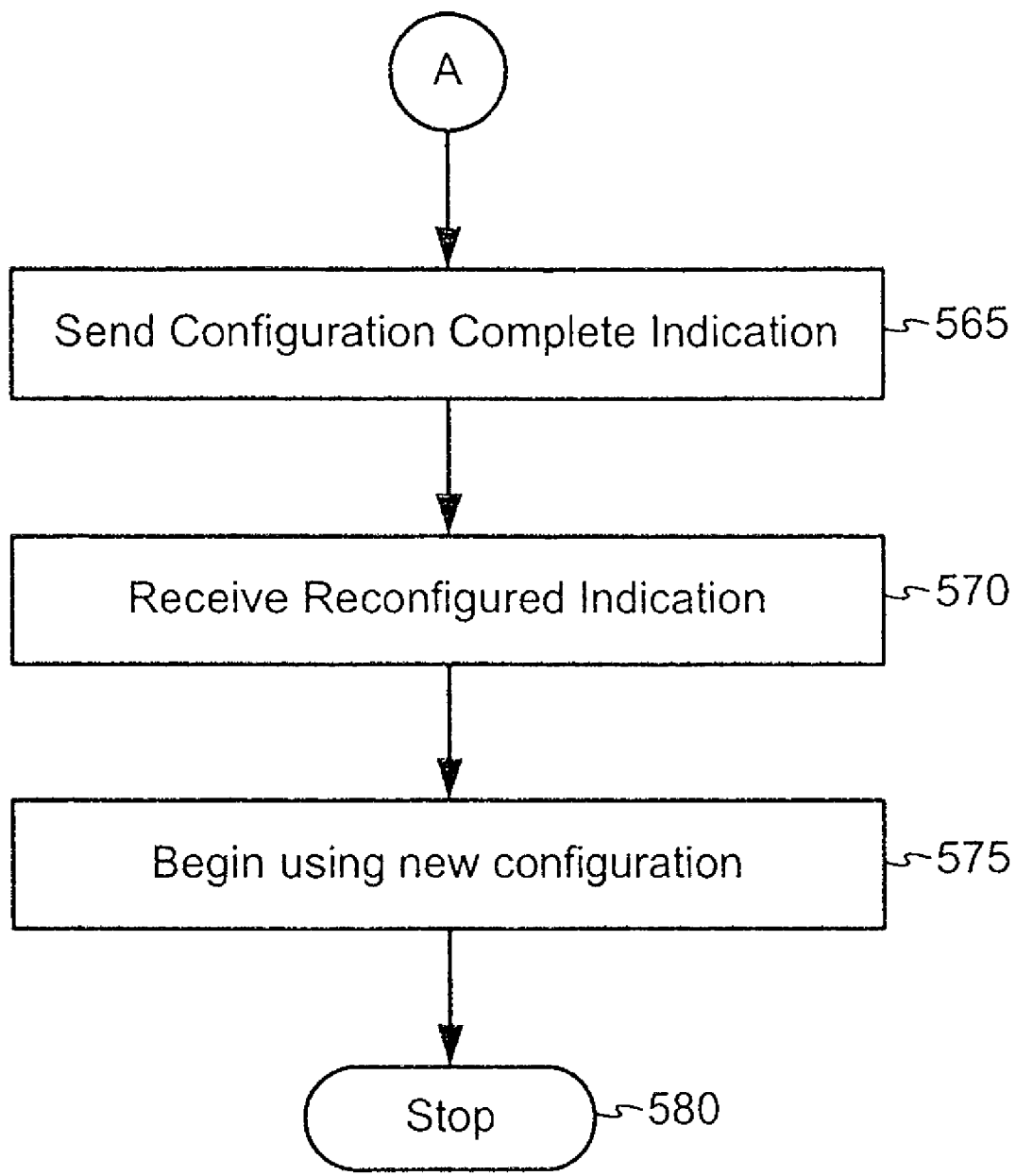
FIG. 5B is a flowchart depicting continuing flow of FIG. 5A.

Alternatively, if the answering protocol process determines that configuration of the session was successful, then control resumes in FIG. 5B with letter A.

In step 565, the answering protocol process transmits a configuration complete indication to the SCP of the AT, thereby notifying the SCP that it is done with its part of the configuration.

Alternatively, if the ID comparison (or other comparisons) does not result in a positive match, the answering protocol process will return a failed protocol negotiation indication to the Session Management Protocol, including data related to the failure (for example, the ID of the offending attribute). Similar to the unsuccessful delivery of the configuration request message described above, an unsuccessful comparison results in the Session Management Protocol closing the current session and sending the data received by the answering protocol process to the AN.

In step 570, the answering protocol process receives an indication from the SCP of the AT informing it that the required configuration has been completed. Thus, the value of the negotiated or previous variables are copied to the current variable accordingly to reflect the new configuration.

In step 575, the answering protocol process begins using the new configuration (for example, the control channel has been changed and the AT is currently utilizing this channel).

Finally, control ends with step 580.

Special Concerns

A. Losing a Traffic Channel

The IS-856 standard utilizes two communication channels, a traffic channel and a non-traffic channel. If there is no traffic channel, data cannot be sent. The concern is that after the configuration request message is sent by any protocol process of the AT, loss of a traffic channel will occur and communication will be trapped in the AT initiated state. The present invention addresses this concern and prevents entrapment in the AT initiated state.

First, the lower layers of the network (for example, the physical layer) notify an Air Link Management Protocol (ALMP) (part of the current IS-856 standard) that a traffic channel was lost. The ALMP then transmits an indication to the SCP of the AT notifying it that the traffic channel was lost. The SCP of the AT re-establishes the connection and retransmits any configuration request messages for which a configuration response message has not been received.

If the SCP of the AT has received a configuration response message in response to all transmitted configuration request messages, the configuration complete message will be transmitted to the network after the lost traffic channel is reacquired. Alternatively, the SCP of the AT causes answering protocol processes to retransmit any configuration request messages through the configure command.

If a traffic channel was lost while one of the answering protocol processes was in the midst of configuration, the ALMP notifies the SCP of the AT that configuration was being by done by one of the answering protocol processes when the loss of a traffic channel occurred. Therefore, in one embodiment, the SCP of the AT will immediately retransmit the configure commands to all answering protocol processes of the AT. In another embodiment, the SCP of the AT maintains a list of protocol processes which accepted its configure command but have yet to return a configuration complete indication. In this embodiment, the SCP of the AT only retransmits the configure command to the answering protocol processes which have not transmitted the configuration complete indication to the SCP (due to the lost traffic channel).

In one embodiment each individual protocol process remembers its negotiation state in order to resend its last outstanding message (that is, the message that it would have transmitted to its peer in the AN before the traffic channel was lost. To determine separations between rounds of negotiations, the particular protocol process can use the closed session, previous session opened, and reconfigured indications to determine the breaks between the various rounds of negotiations.

Eventually, one of the following events will occur:

(1) all answering protocol processes will complete their configuration, and communication will then proceed to an AN Initiated state;

(2) the session will close due to the time for awaiting a configuration response message in one of the protocol (either the SCP protocol of the AT, or one of the answering protocols);

(3) the session will close due to the maximum number of retransmission attempts for transmitting the configuration request message; or (4) the session will close due to a reacquisition after a fade, and a different network is acquired.

B. Losing Network Acquisition

As previously discussed, the present invention prevents entrapment in the AT initiated state during a lost traffic channel. Likewise, the present invention handles the situation in which network acquisition is lost (that is, the entire network is lost). From the perspective of the SCP of the AT, this situation is handled as discussed above for the situation in which a lost traffic channel occurs. However, before transmitting the configuration request message to the network, the SCP must first wait until a network is acquired. From the perspective of one of the answering protocols, the present invention handles this situation as described above for the lost traffic channel situation.

It is anticipated that the features of the present invention are performed and/or controlled by control processor 604, included in computer system 600. Computer system 600 includes one or more processors, such as processor 604. One or more processors 604 can execute software and implement all or part of the features of the present invention described herein. Each processor 604 is connected to a communication infrastructure 602 (for example, a communications bus, cross-bar, or network). After reading this description, it will become apparent to a person skilled in the relevant art how to implement the invention using other computer systems and/or computer architectures.

Computer system 600 also includes a main memory 612, preferably random access memory (RAM), and can also include secondary memory 614. Secondary memory 614 can include, for example, a hard disk drive 616 and/or a removable storage drive 618, representing a floppy disk drive, a magnetic tape drive, an optical disk drive, et cetera. The removable storage drive 618 reads from and/or writes to a removable storage unit 620 in a well-known manner. Removable storage unit 620 represents a floppy disk, magnetic tape, optical disk, etc., which is read by and written to by removable storage drive 618. As will be appreciated by a person skilled in the relevant art, the removable storage unit 620 includes a computer usable storage medium having stored therein computer software and/or data.

In alternative embodiments, secondary memory 614 may include other similar means for allowing computer programs or other instructions to be loaded into computer system 600. Such means can include, for example, a removable storage unit 624 and an interface 622. Examples can include a removable memory chip (such as an EPROM, or PROM) and associated socket, and other removable storage units 624 and interfaces 622 which allow software and data to be transferred from the removable storage unit 624 to computer system 600.

Computer system 600 can also include a communications interface 630. Communications interface 630 allows software and data to be transferred between computer system 600 and external devices via communications path 635. Examples of communications interface 630 can include a modem, a network interface (such as an Ethernet card), a communications port, ecetera. Software and data transferred via communications interface 630 are in the form of signals which can be electronic, electromagnetic, optical or other signals capable of being received by communications interface 630, via communications path 635. Note that communications interface 630 provides a means by which computer system 600 can interface to a network such as the Internet.

Figure 6:
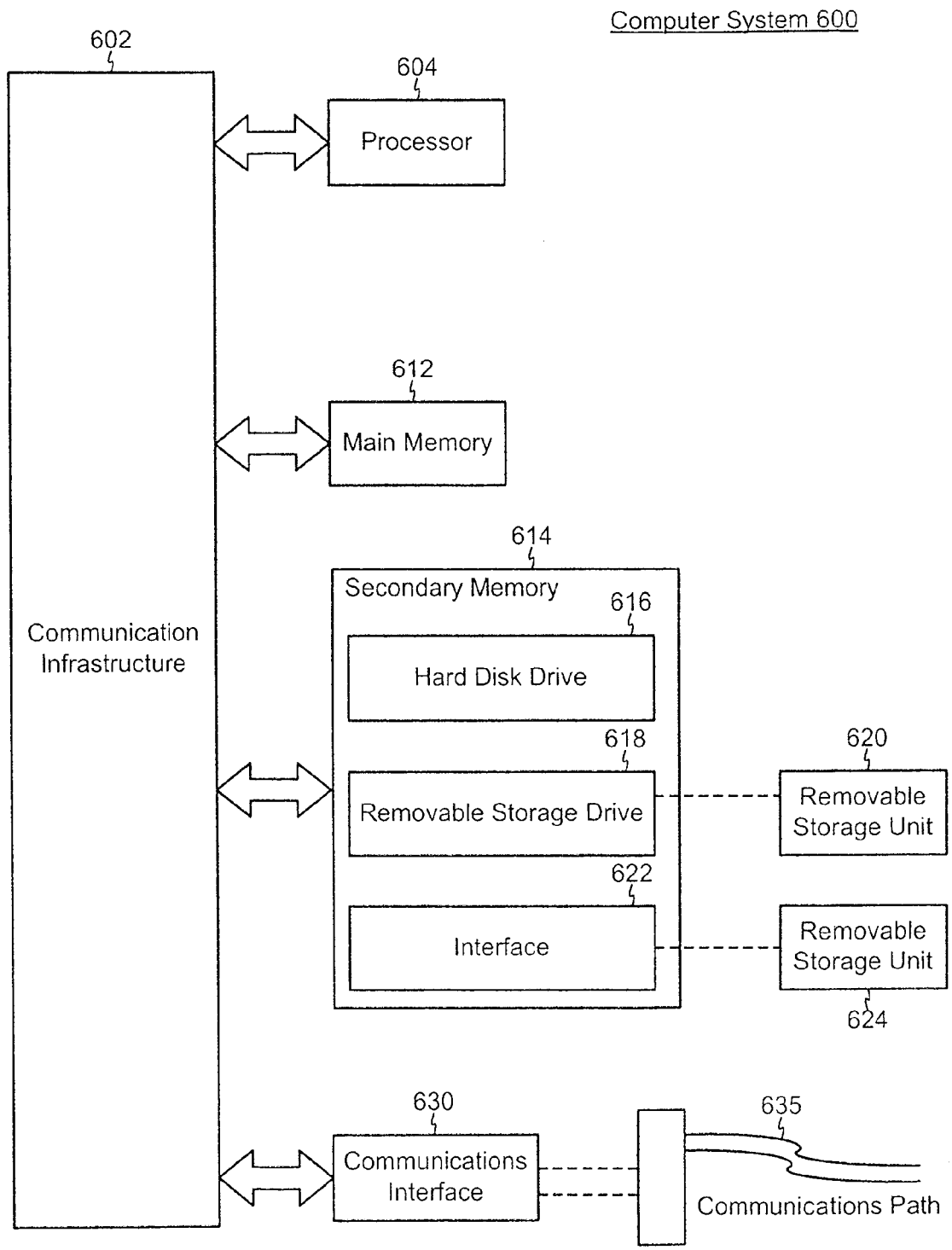
FIG. 6 is a block diagram of an apparatus implementing protocol management.

The present invention can be implemented using software running (that is, executing) in an environment similar to that described above with respect to FIG. 6. In this document, the term "computer program product" is used to generally refer to removable storage unit 620, a hard disk installed in hard disk drive 618, or a carrier wave or other signal carrying software over a communication path 635 (wireless link or cable) to communications interface 630. A "computer useable medium" can include magnetic media, optical media, or other recordable media, or media that transmits a carrier wave. These computer program products are means for providing software to computer system 600.

Computer programs (also called computer control logic) are stored in main memory 612 and/or secondary memory 614. Computer programs can also be received via communications interface 630. Such computer programs, when executed, enable the computer system 600 to perform the features of the present invention as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 618, hard drive 616, or communications interface 630. Alternatively, the computer program product may be downloaded to computer system 600 over communications path 635. The control logic (software), when executed by the one or more processors 604, causes the processor(s) 604 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to a person skilled in the relevant art.

Conclusion

While various embodiments of the invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus the invention should not be limited by any of the above-described exemplary embodiments, but should be defined only in accordance with the following claims and their equivalents.

The invention claim is:

1. An access terminal, in which configuration and coordination of a plurality of protocol processes occurs to allow said protocol to act in a cohesive manner to correctly emulate an expected communication interface with a corresponding group of protocol in a network protocol stack, comprising:

means for causing the access terminal to detect a need to change an existing condition in the access terminal;

means for addressing said need by sending a configuration command from a session configuration protocol process located within the access terminal, said configuration command being sent to an answering protocol process comprising an attribute for controlling said change, said answering protocol process being located within the access terminal; and means for determining if said answering protocol process accepts or rejects said change, wherein both the session configuration protocol and the answering protocol processes concurrently reside in the access terminal.

2. The access terminal of claim 1, further comprising:

means for sending a failed protocol negotiation indication from said answering protocol process to said session configuration protocol process of the access terminal.

3. The access terminal of claim 2, further comprising:

means for sending a configuration complete indication from said answering protocol process to said session configuration protocol process of the access terminal.

4. A method performed within an access terminal communicating in a communication network, the method comprising:

reading at least one session configuration variable from non-volatile memory if a session configuration protocol process determines configuration data in the non-volatile memory should be used based on a status of a current session;

assigning a default value to the at least one session configuration variable if the session configuration protocol process determines no configuration variables are stored in non-volatile memory; and sending a configuration command from the session configuration protocol process to an answering protocol process, the configuration command comprising an attribute for controlling a need to change an existing status of the answering protocol process, wherein both the session configuration protocol and the answering protocol processes concurrently reside in the access terminal.

5. The method in accordance with claim 4, further comprising:

transmitting an acceptance from the answering protocol process to the session configuration protocol process if the answering protocol process accepts the configuration command; and terminating further processing if the answering protocol process rejects the command.

6. The method in accordance with claim 5, further comprising:

sending a configuration complete indication from the answering protocol process to the session configuration protocol if the answering protocol process accepts the configuration command.

7. The method in accordance with claim 6, further comprising:

sending a message to the network in response to receiving a configuration complete indication from all protocol processes in the access terminal that accepted the configuration command.

8. The method in accordance with claim 6, wherein the transmitting the acceptance comprises:

sending a value of true from the answering protocol process to the session configuration protocol process in response to the acceptance of the configuration command.

9. The method in accordance with claim 6, wherein terminating comprises:
sending a value of false from the answering protocol process to the session configuration protocol process in response to rejection of the configuration command.

10. The method in accordance with claim 6, further comprising:
sending a failed protocol negotiation indication from the answering protocol process to the session configuration protocol process upon expiration of a specified time period if the answering protocol process accepted the configuration command.

11. The method in accordance with claim 6, further comprising:
if the answering protocol process accepted the configuration command, sending a failed protocol negotiation indication from the answering protocol process to a session management protocol process in response to a determination that an attribute identified in a response message does not match an attribute identified in a request message.

12. The method in accordance with claim 6, further comprising:
if the answering protocol process accepted the configuration command, sending identification data corresponding to an offending attribute from the answering protocol process to a session management protocol process.

13. The method in accordance with claim 6, further comprising:
sending a configuration request message from the session configuration protocol process to the network before sending the configuration command.

14. The method in accordance with claim 6, further comprising:
if said answering protocol process accepted the configuration command, sending a failed protocol negotiation indication after a specified number of session configuration attempts by the answering protocol process.

15. The method in accordance with claim 6, further comprising:
sending a configuration request message from the answering protocol process in the access terminal to a corresponding peer in the network; and
receiving a configuration response message at the answering protocol process in response to the configuration request message transmitted from the answering protocol process.

16. The method in accordance with claim 15, further comprising:
limiting a time period between the receiving and the sending.

17. The method in accordance with claim 6, further comprising:
exiting an access terminal initiation stage.

18. The method in accordance with claim 6, further comprising the step of:
repeating the sending and receiving.

19. An apparatus configured for use in an access terminal for communicating within a wireless communication network, the apparatus comprising:
a session configuration protocol (SCP) process for communicating with a peer network SCP process in accordance with a session configuration protocol governing a maintenance of protocol parameters; and
a plurality of answering protocol processes, each answering protocol process configured to send a reconfiguration request indication to the SCP process indicating a requirement for reconfiguration of the answering protocol process, the SCP process configured to send a configuration command to the plurality of answering protocol processes in response to receiving at least one reconfiguration request indication, wherein the session configuration protocol process and the plurality of the answering protocol processes concurrently reside in the same access terminal.

20. The apparatus in accordance with claim 19, wherein each of the plurality of answering protocol processes is further configured to send an acceptance indication if configuration is required and send a rejection indication if configuration is not required.

21. The apparatus in accordance with claim 20, wherein each of the plurality of answering protocol processes is further configured to send a configuration request message to a peer network protocol process if configuration is required.

22. The apparatus in accordance with claim 21, wherein each of the plurality of answering protocol processes is further configured to receive, from the peer network protocol process, a configuration response message comprising an identification of a configured variable of the answering protocol process.

23. The apparatus in accordance with claim 19, wherein the SCP process is further configured to transmit a configuration request message to the peer network SCP process if configuration of the SCP process is required.

24. The apparatus in accordance with claim 23, wherein the SCP process is further configured to receive a configuration response message from the peer network SCP process.

25. The apparatus in accordance with claim 24, wherein the SCP process is configured to transmit the configuration command to the plurality of answering protocol processes after determining that configuration of the SCP process is not required.

26. The apparatus in accordance with claim 25, wherein the SCP process is further configured to send a configuration complete message to the peer network SCP process if the SCP process receives a configuration complete indication form the answering protocol process.

27. The apparatus in accordance with claim 26, wherein the SCP process is further configured to receive a configuration complete response message from the peer network SCP process.

28. The apparatus in accordance with claim 25, wherein the SCP process is further configured to close a current configuration session if a failed protocol negotiation indication is received from any of the plurality of answering protocol processes.

* * * * *